PRODUCTION OF MUSIC

Original Filed July 30, 1932 9 Sheets-Sheet 1

PRODUCTION OF MUSIC

Original Filed July 30, 1932 9 Sheets-Sheet 2

INVENTOR.
Westley F. Curtis,
BY
John C. Grady
ATTORNEY.

PRODUCTION OF MUSIC

Original Filed July 30, 1932 9 Sheets-Sheet 3

INVENTOR.
Westley F. Curtis,
BY
John O Brady
ATTORNEY

INVENTOR.
Westley F. Curtis,
BY
John B. Brady
ATTORNEY.

PRODUCTION OF MUSIC

Original Filed July 30, 1932 9 Sheets-Sheet 5

INVENTOR.
Westley F. Curtis,
BY John C. Brady
ATTORNEY.

Sept. 10, 1940. W. F. CURTIS Re. 21,554

PRODUCTION OF MUSIC

Original Filed July 30, 1932 9 Sheets-Sheet 6

INVENTOR.
Westley F. Curtis,
BY
John A. Brady
ATTORNEY.

PRODUCTION OF MUSIC

Original Filed July 30, 1932 9 Sheets-Sheet 7

INVENTOR.
Westley F. Curtis,
BY
John B. Brady
ATTORNEY.

PRODUCTION OF MUSIC

Original Filed July 30, 1932 9 Sheets-Sheet 8

INVENTOR.
Westley F. Curtis,
BY
John O. Brady
ATTORNEY.

Sept. 10, 1940. W. F. CURTIS Re. 21,554

PRODUCTION OF MUSIC

Original Filed July 30, 1932 9 Sheets-Sheet 9

INVENTOR.

By Westley F. Curtis, John B. Brady Attorney

Reissued Sept. 10, 1940

Re. 21,554

UNITED STATES PATENT OFFICE 21,554

PRODUCTION OF MUSIC

Westley F. Curtis, Beaver Heights, Md., assignor, by mesne assignments, to Hammond Instrument Company, Chicago, Ill., a corporation of Delaware Original No. 2,001,708, dated May 21, 1935, Serial No. 626,942, July 30, 1932. Application for reissue October 21, 1936, Serial No. 106,900

24 Claims. (Cl. 84—1.22)

My invention relates broadly to the production of music and more particularly to an electrically operated system for producing music.

One of the objects of my invention is to provide a simplified system of electrically producing music of improved quality.

Another object of my invention is to provide an electrical system for producing music over a wide frequency range in which the parts of the apparatus may be inexpensively manufactured on a quantity production basis.

Still another object of my invention is to provide a method for producing music by controlling the value of a varying reactance for correspondingly controlling the amplitude or frequency of electrical energy for directly controlling a sound producing circuit.

A further object of my invention is to provide an electrical circuit having a sound producer connected in the output thereof with means for connecting selected varying reactances in the input circuit for controlling the operation of the circuit in the production of tones which may be combined for the production of music.

Another object of my invention is to provide a musical instrument having a plurality of tone qualities, one or more of which may be selected at the option of the operator.

Still another object of my invention is to provide a construction of simplified radio broadcast announcing device having tones arranged in an arpeggio similar to a clock chimes.

A still further object of my invention is to provide a construction of varying capacity device having component parts adapted to select and influence the operation of an electrical system according to a musical scale for the production of music.

Another object of my invention is to provide a construction of varying capacity means adapted to selectively control the operation of an electron tube system according to a musical scale for the production of music.

Still another object of my invention is to provide an arrangement for a multiplicity of reactances varying at frequencies corresponding to the frequencies of a musical scale in combination with a suitable keying arrangement for selecting reactances corresponding to desired tones for controlling the functioning of the electron tube system for the production of music.

Figure 1:
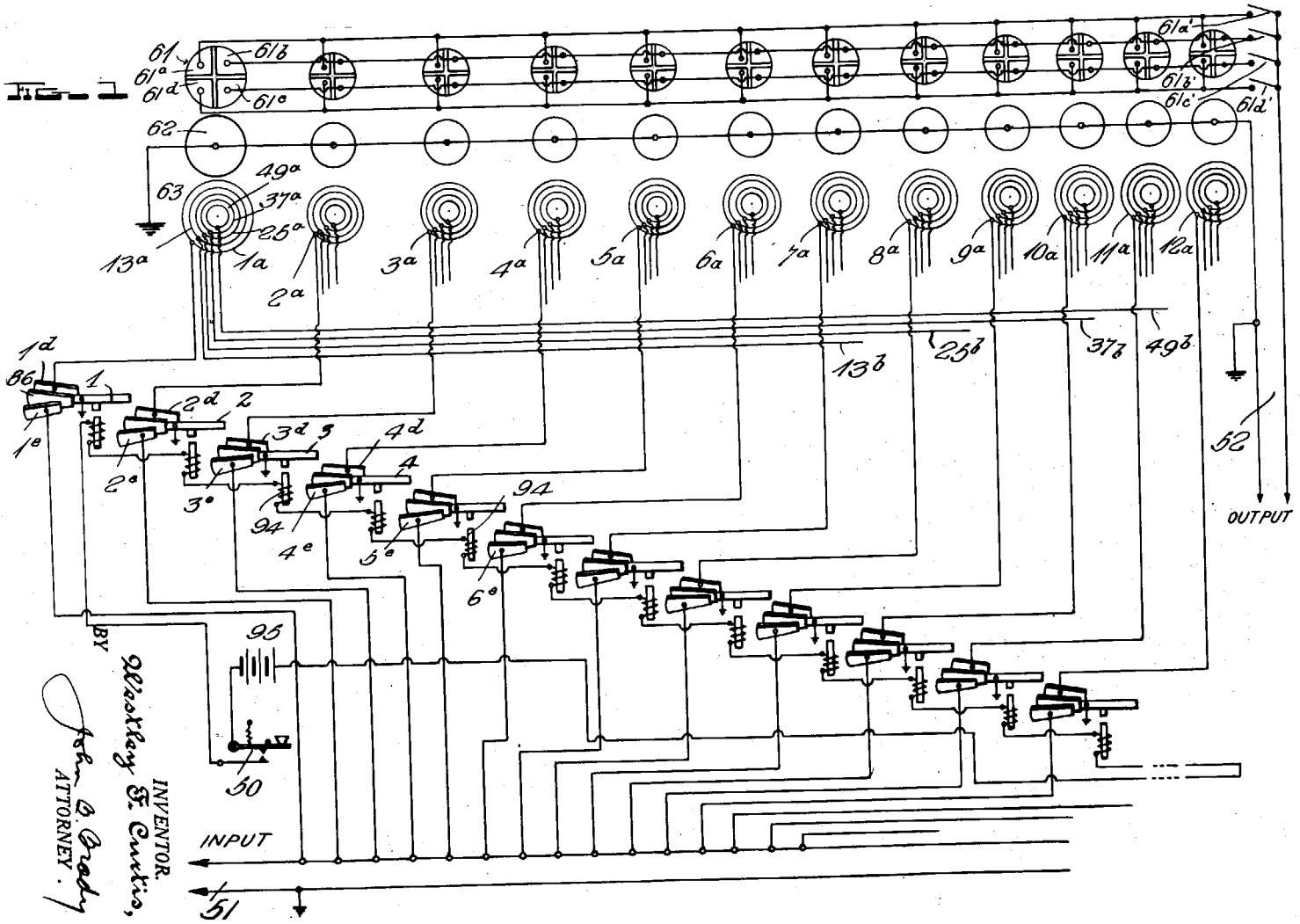
Figures 1, 2:
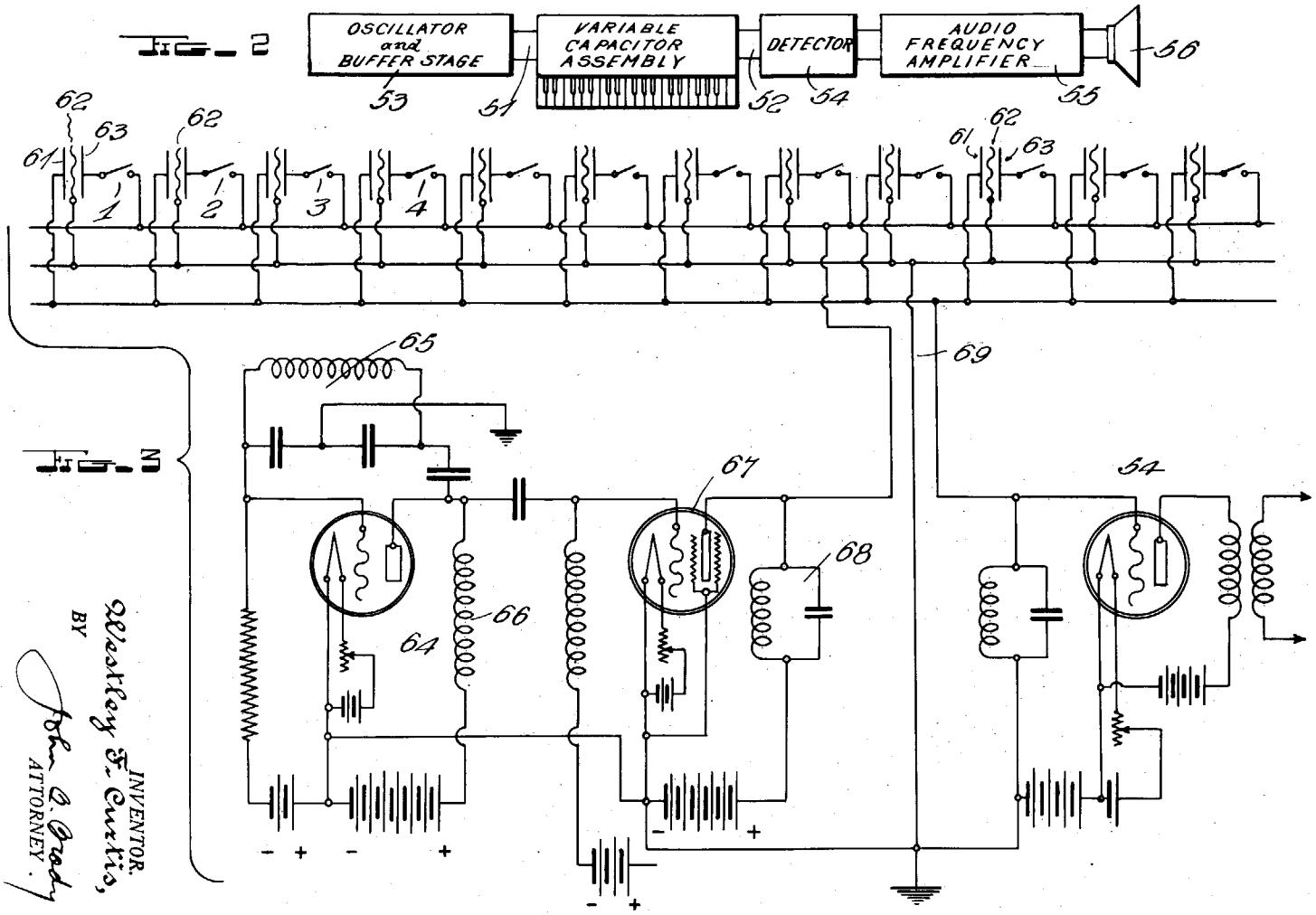
Figure 4:
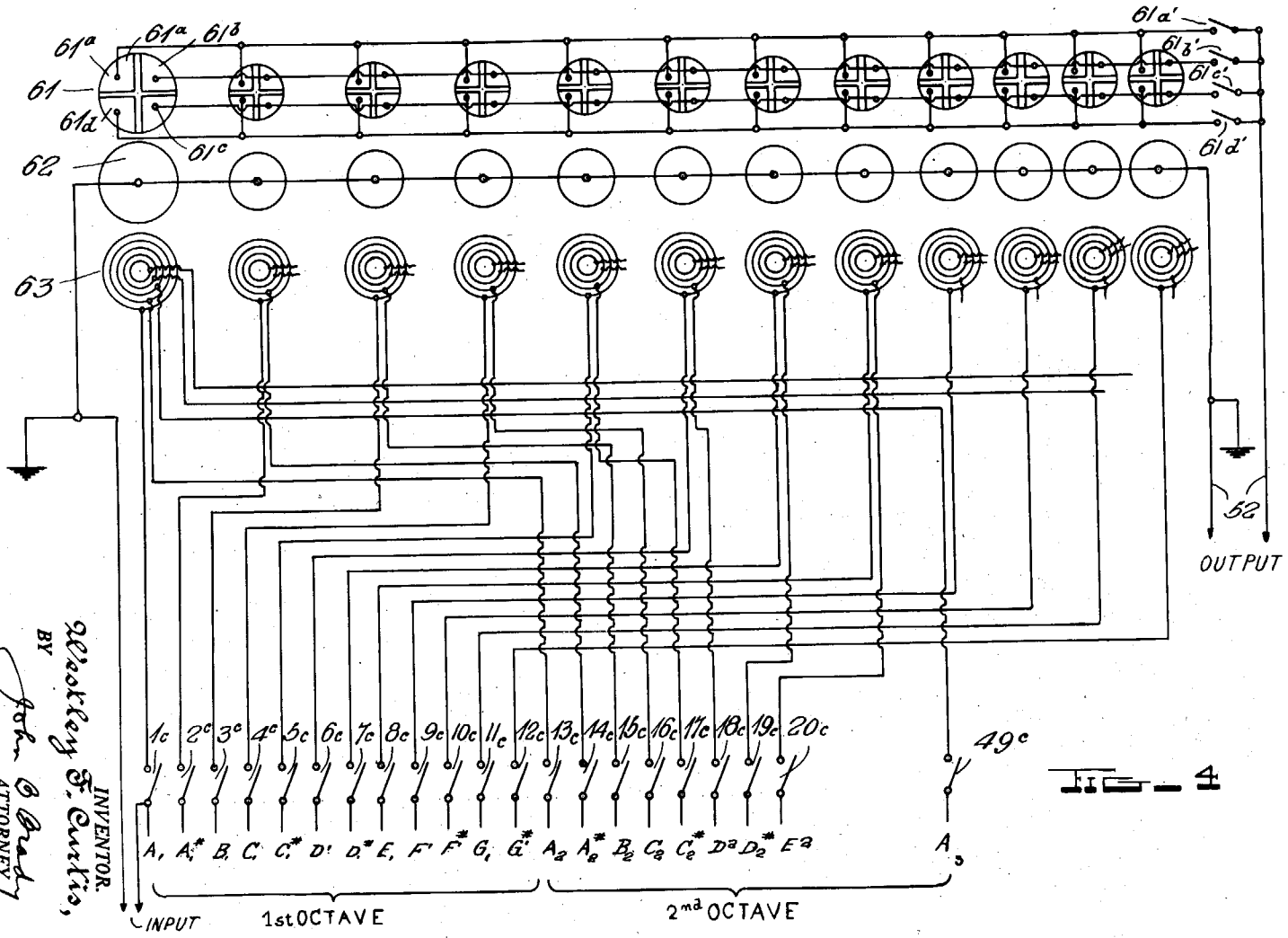
Figure 6:
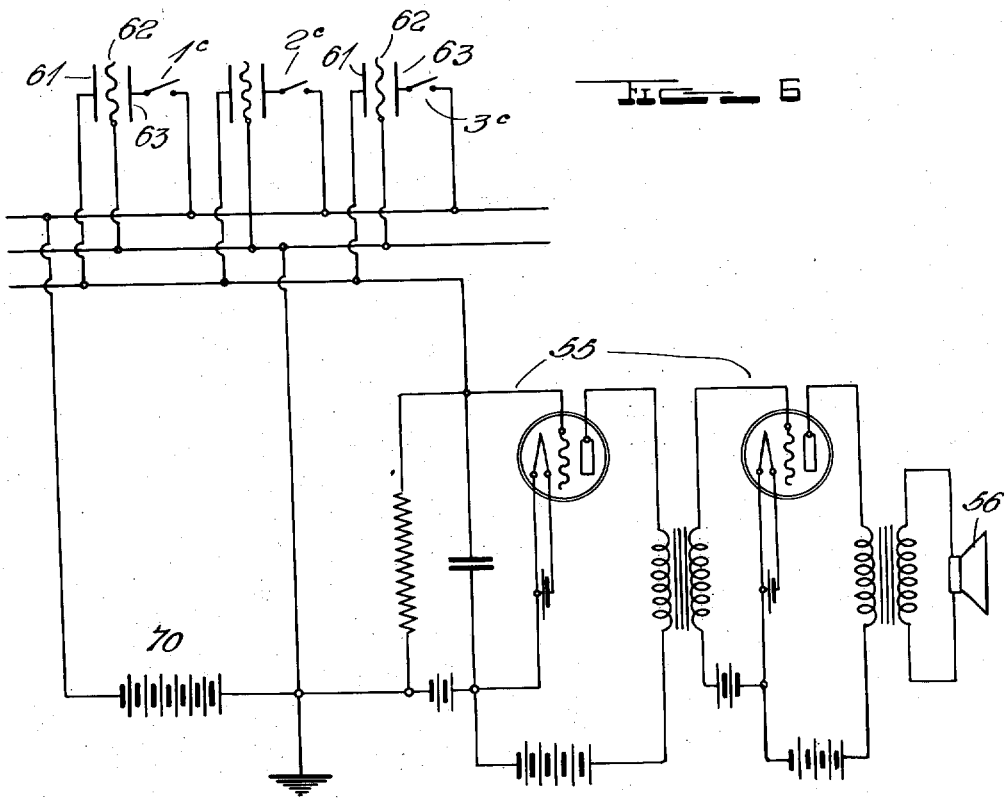
Figure 5:
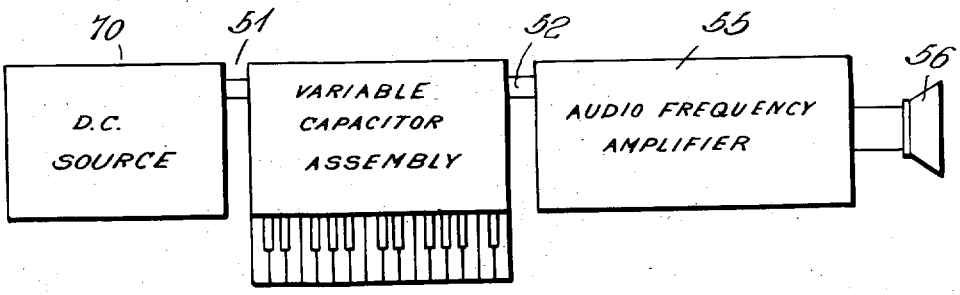
Figure 7:
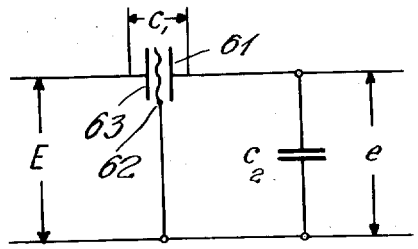
Figure 8:
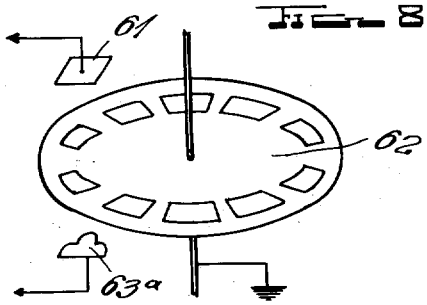
Figure 17:
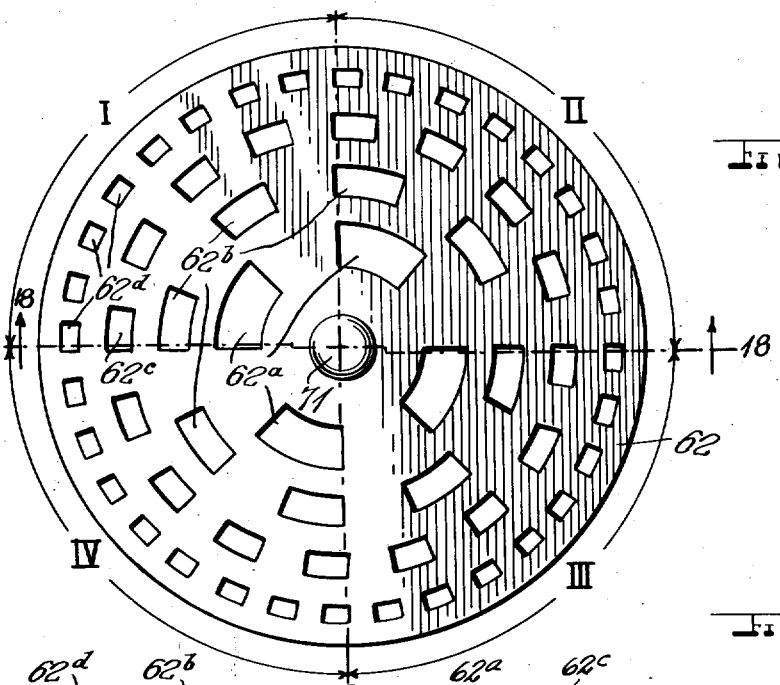
Figure 18:
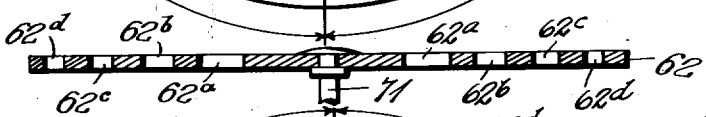
Figure 19:
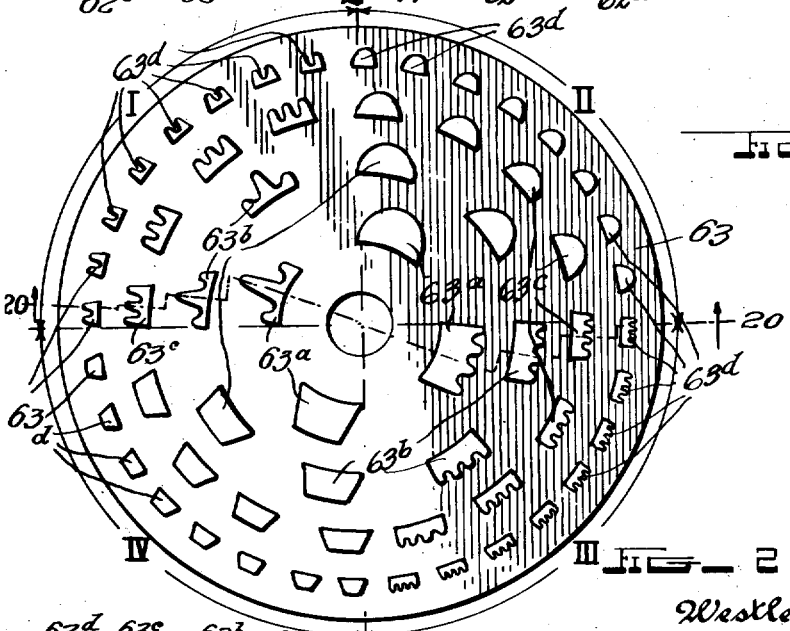
Figure 20:
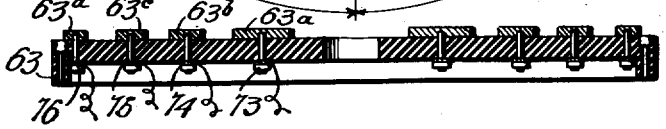
Figure 21:
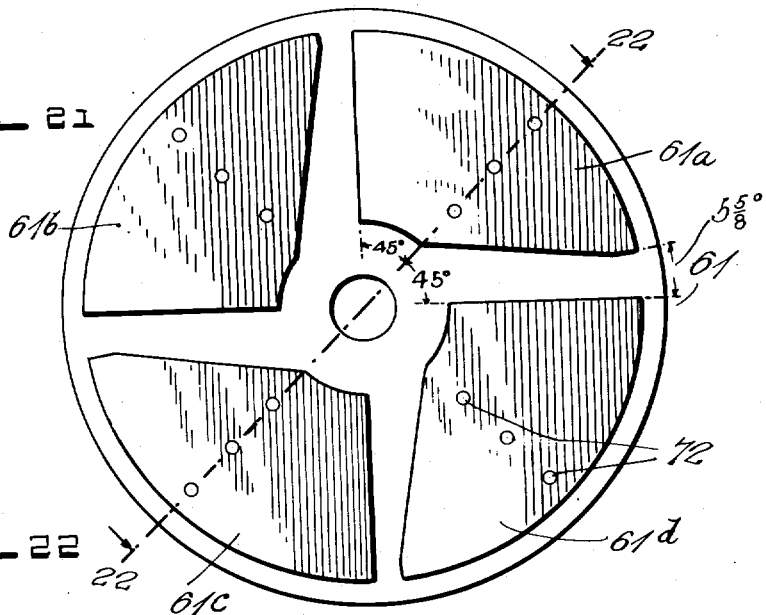
Figure 22:
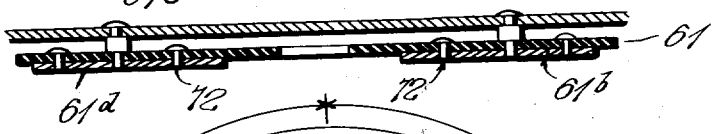
Figure 23:
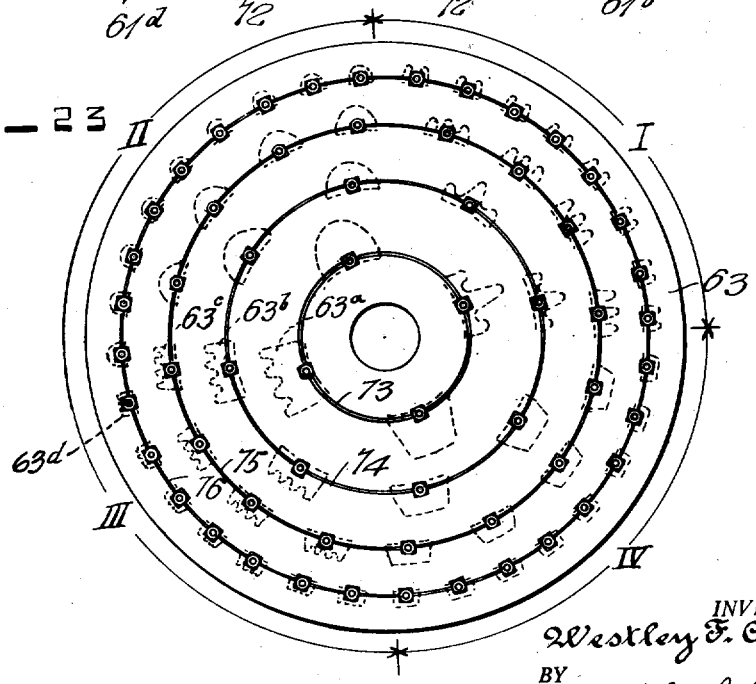
Figure 23:
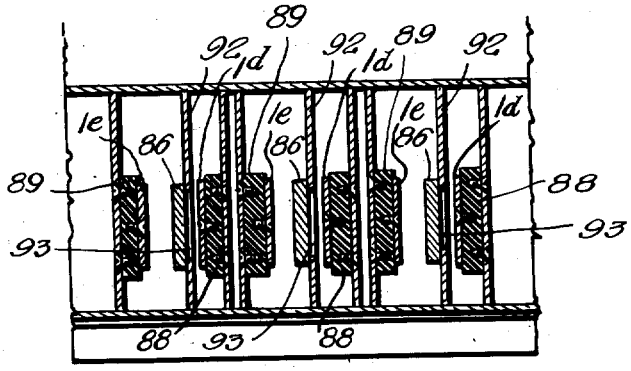
Figure 24:
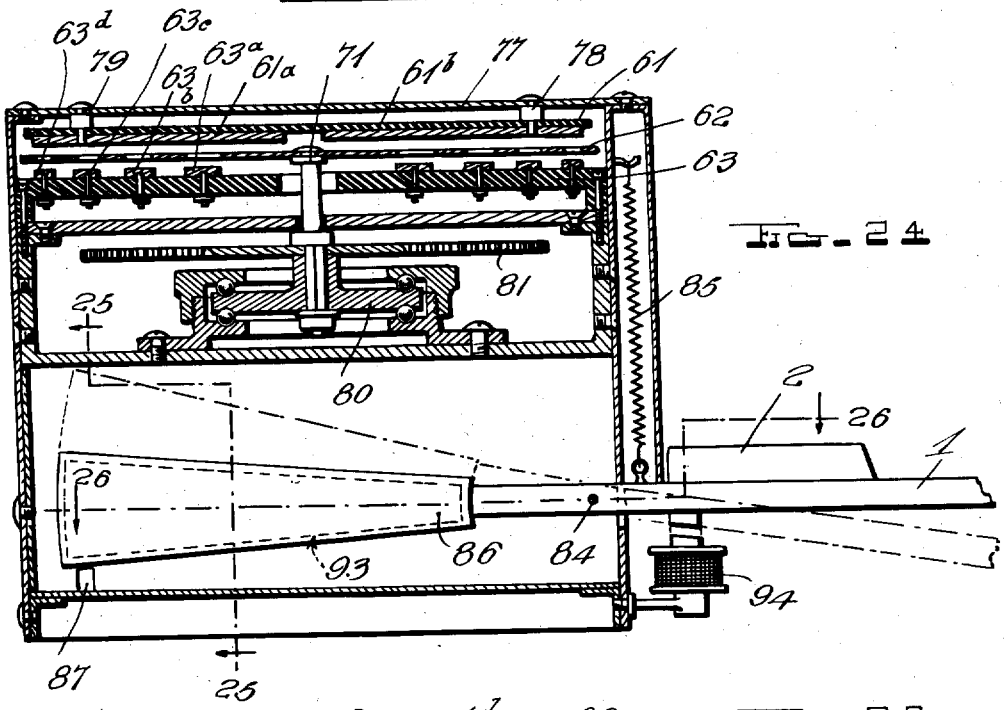
Figure 26:
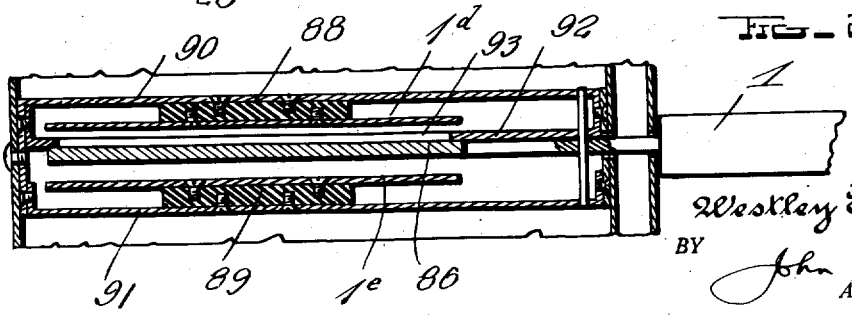
Figure 28:
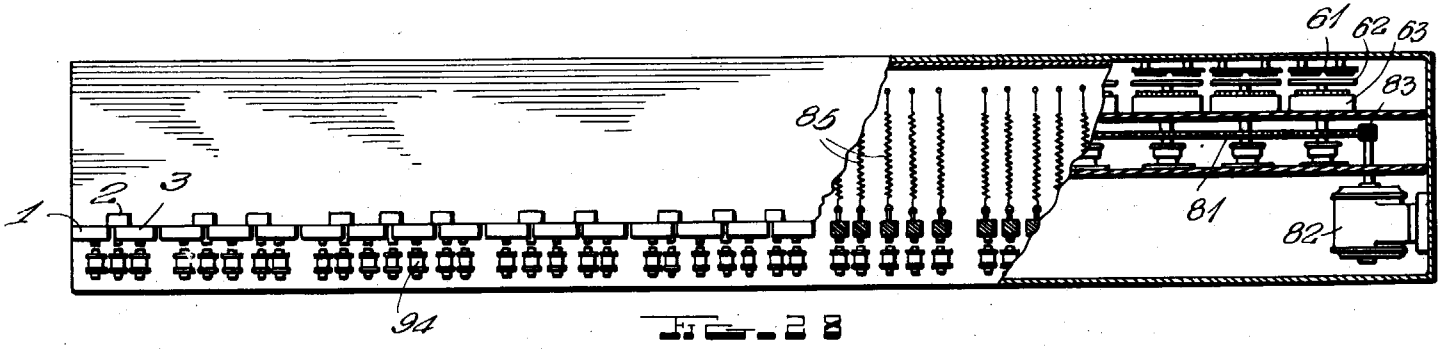
Figure 27:
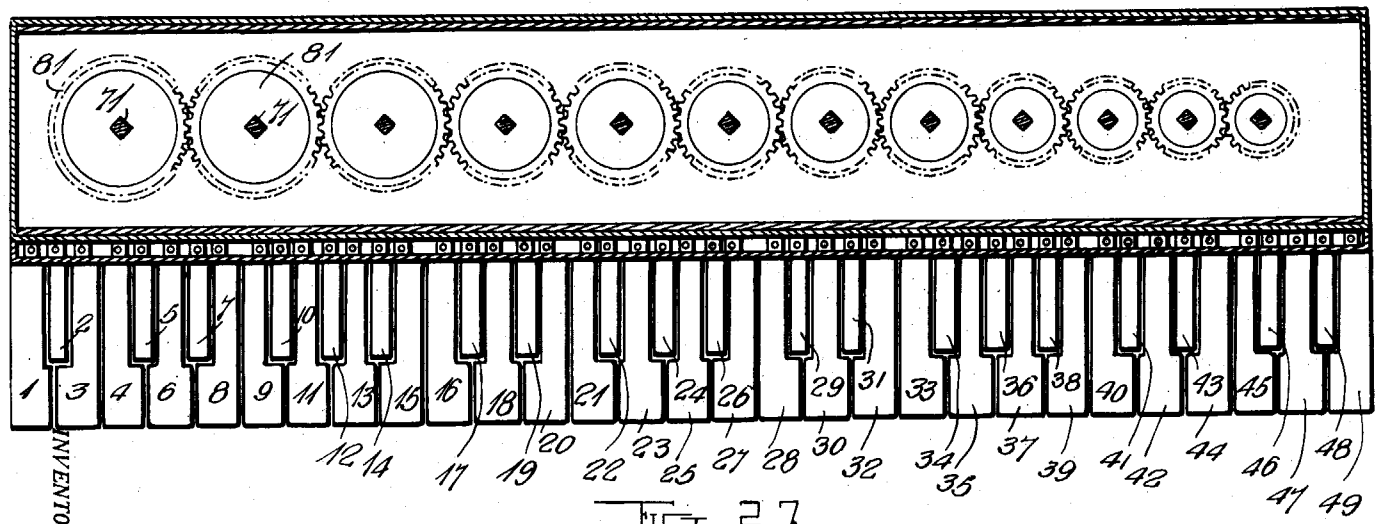

Other and further objects of my invention reside in the construction of a varying capacitor apparatus for controlling the functioning of an electrical system for the production of music as set forth more fully in the specification hereinafter following by reference to the accompanying drawings, in which:

Figure 1 is a schematic and diagrammatic arrangement of the parts of the electrical system employed in my invention for the production of music; Fig. 2 is a schematic view showing the relation of the several elements constituting the electrical system of my invention; Fig. 3 shows one form of electrical circuit which may be employed in the system of my invention in which selected reactances control the modulation at selected tones of a high frequency oscillation system with respect to a detection and sound producing circuit; Fig. 4 shows a wiring diagram of a modified form of sound producing system embodying the principles of my invention; Fig. 5 is a schematic view showing the relation of the several elements employed in the form of the invention illustrated in Fig. 4; Fig. 6 is a wiring diagram of the modified form of sound producing system illustrated in Fig. 5; Fig. 7 is an elemental circuit diagram showing the principle of the system of my invention; Fig. 8 is a theoretical diagram explaining the principle of the varying capacitor employed in the system of my invention; Figs. 9, 10, 11, 12, 13, 14, 15 and 16 illustrate various forms of capacity elements used in the varying capacitor for controlling the reactances of the electrical system according to a predetermined tone quality; Fig. 17 is a plan view of the central rotor plate in the varying capacitor assembly of my invention; Fig. 18 is a cross-sectional view taken through the rotor plate of Fig. 17 on line 18—18 thereof; Fig. 19 is a plan view of the lower stator element of the varying capacitor assembly; Fig. 20 is a cross-sectional view through the stator capacitor element on line 20—20 of Fig. 19; Fig. 21 is a lower plan view of the upper stator element of the varying capacitor assembly; Fig. 22 is a cross-sectional view through the stator element of Fig. 21 on line 22—22 of Fig. 21; Fig. 23 is a lower plan view of the lower stator element of the varying capacitor assembly shown in Fig. 19; Fig. 24 is a cross-sectional view taken through the varying capacitor assembly of my invention and illustrating one of the keying elements in side elevation; Fig. 25 is a sectional view taken through the variable capacity controlled by the keying elements of the keyboard illustrated in Fig. 24, the view being taken on line 25—25 of Fig. 24; Fig. 26 is a longitudinal cross-sectional view taken through one of the variable capacity elements controlled by one of the keys of the control keyboard illustrated in Fig. 24; Fig. 27 is a plan view showing the keyboard in the apparatus of my invention and the relation thereof to the varying capacitor assembly; and Fig. 28 is an elevational view of the keyboard with a portion of the frame structure broken away to illustrate the varying capacitor assemblies which are associated with the keyboard.

My invention is directed to an improved construction of apparatus for the production of music wherein an electrical sound producer is connected in the output circuit of an electron tube system and the input circuit of an electrical tube system controlled by selected varying reactances for producing selected notes or tones in the sound producer. I may employ what I have termed a direct current system in which the selected reactances directly control the input circuit of an electron tube amplifier, in the output circuit of which a sound producer is connected. I may employ what I have termed a high frequency method in which the varying reactances are caused to control the amplitude or the frequency of high frequency electrical oscillations which are impressed upon a detector circuit for operating the electrical sound producer. I provide a multiplicity of varying reactances of frequencies corresponding to the frequencies of the musical scale. A suitable keying arrangement is provided for selecting reactors corresponding to desired tones. The modulation method may be employed in association with a high frequency oscillator system where a high degree of quality is essential and where the space and size of the instrument is not a dominating factor. Where, however, it is necessary to reduce the cost of the instrument and mount the parts within a highly compact area, I employ the direct current method and obtain substantially the same results. The mechanical means for causing the reactance to vary in accordance with a predetermined wave form at a predetermined frequency may have various forms and the structure I have adopted for illustrating my invention is but one of the several forms which the varying reactance of my invention may take. I provide an electrostatic shield in the form of a rotary plate which is perforated at predetermined intervals to control the capacity exposure of preformed conductive segments at a rate at which the reactance of a circuit may be controlled at an audible frequency. The conductive segments have their shape or form mathematically determined with a high degree of precision for the production of tones of predetermined quality. In order to obtain a wide range of tones, I arrange the shaped segments in concentric rings on adjacent positively driven discs which control the rate of capacity exposure and correspondingly control the reactance across a circuit terminating at the segments and at fixed plates extending parallel to the segments on the opposite side of the driven rotor plates. Selective circuits are provided for rendering certain of the varying reactances effective upon the sound producing circuit for the production of sound. Many modifications of my invention may be made and the forms of the invention herein illustrated are to be considered in the illustrative sense rather than in a limiting sense.

The purpose of the system of my invention is to produce a musical instrument, played by a keyboard like an organ, in which any desired quality or timbre can be attained. The timbre is to be independent of the skill of the operator, and any number of notes can be sounded simultaneously and for as long a time as is desired. Further, the timbre may be independent of the pitch if desired. The timbre may be varied in steps by using a multiplicity of sets of elements controlled by stops, or by interchangeable sets of elements. It may be varied continuously by introducing selective filters, or by utilizing the non-linear characteristics of vacuum tubes.

There are at present three well-known ways of electrically reproducing musical sounds:—

(*a*) The mechanical or phonograph method: A needle, electrically or mechanically connected to a diaphragm or other sounding body, is made to traverse a groove at a fixed rate of speed. This groove is modified either by depressions and elevations or oscillations from side to side in such a way that the resulting vibrations of the needle, when transmitted to the diaphragm, produce the desired sound.

(*b*) The optical or talking-picture method: A ray of light is made to fluctuate in intensity by passing through a moving film which absorbs varying amounts of light. These fluctuations are transformed into electrical impulses by a photo-cell, suitably amplified and impressed on a loud-speaker.

(*c*) The magnetic or telegraphone method: A wire is transversely magnetized, the intensity of magnetization varying in accordance with the desired sound wave. When this wire is run through the air-gap of an iron core coil, there is generated an E. M. F. which, when properly amplified and transmitted to a loud-speaker, produces the desired sound.

My invention avoids all of the defects of the previous methods of electrical sound reproduction by eliminating the phonograph stylus, the use of light-sensitive cells and the employment of fragile wire elements as used in the telegraphone. The advantages of my invention will be understood from the structure described in detail in the specification hereinafter following.

Referring to the drawings in detail, I have illustrated one arrangement of the musical apparatus of my invention in Fig. 1 wherein twelve sets of varying capacitors have been shown for obtaining a varying reactance control of an electron tube system over a wide musical range. The twelve sets of varying capacitors commence left to right, with five sets of frequency determining segments in the first varying capacitor and four sets of frequency determining segments in the other varying capacitors. That is, there are eleven varying capacitors having frequency determining segments disposed in four concentric paths on a fixed stator support and one varying capacitor including a stator support having five concentric rings of frequency determining segments thereon. The varying capacitors include a rotor element having apertures corresponding in number with the number of frequency determining segments on the stator, the rotor having its perforations aligned with the frequency determining segments on the stator and operating immediately beneath the fixed sectors of the upper stator. All of the rotors for the twelve sets of varying capacitors are stamped from the same die. Each of the inner concentric paths has four perforations. The next concentric path has eight perforations. The succeeding concentric path has sixteen perforations. The outer concentric path in the rotor elements of all of the varying capacitors except the unit to the extreme left is provided with thirty two perforations. In the unit to the extreme left, an additional concentric path is provided in the rotor element and has sixty four perforations. The cut-out portions or perforations in each of the rotor plates are of a size substantially embracing the area of the conductive segments constituting the lower capacity area of the varying capacitor and coacting with the stationary segments in the upper stator. That is to say, the cut-out portions of the rotor permit the exposure of the entire area of the conductive segments on the lower stator plate with respect to the solid segments on the upper stator plate intermediate each shielding operation which is effected by movement of the rotor plate. In the musical apparatus illustrated, there are forty-nine playing keys comprising four octaves as follows: The first octave comprises a set of playing keys numbered 1, 2, 3, 4, 5, 6, 7, 8, 9, 10, 11 and 12. The second octave comprises playing keys numbered 13, 14, 15, 16, 17, 18, 19, 20, 21, 22, 23 and 24. The third octave comprises playing keys numbered 25, 26, 27, 28, 29, 30, 31, 32, 33, 34, 35 and 36. The fourth octave comprises playing keys 37, 38, 39, 40, 41, 42, 43, 44, 45, 46, 47, 48 and 49.

In Fig. 1, only sufficient space is available for illustrating the playing keys comprising the first octave, that is, keys numbered 1 to 12 which have been shown in partial perspective arrangement. The keyboard is shown more clearly in Figs. 27 and 28 and the individual structure of the keys shown more clearly in Figs. 24, 25 and 26. The electromagnets below each of the playing keys are connected in series and controlled by a master switch 50, which master switch may be operated by a foot pedal under control of the player to obtain proper control of the music by enabling the keys which have been depressed to be held down for a predetermined time interval. All of the magnets beneath the playing keys are energized from a common potential source and hence, as each key or a set of keys is depressed by the player, these keys will remain depressed by reason of the holding magnets until the player releases the master switch 50 in accordance with the requirements of the music. The forty-nine playing keys are divided as illustrated more clearly in Figs. 27 and 28 into sharps or flats and naturals. The short black keys which, when operated in one direction, are sharps and which, when operated in the opposite direction, are flats designating the semi-tones and are divided as follows: In the first octave, keys #2, 5, 7, 10 and 12 are black keys or semi-tone keys. In the second octave, keys #14, 17, 19, 22, and 24 are black keys or semi-tone keys. In the third octave, keys #26, 29, 31, 34 and 36 are black keys. In the fourth octave, keys #38, 41, 43, 46 and 48 are black keys. Each black key is the sharp of the white key immediately below it and also the flat of the white key immediately above it. That is to say, the short black keys serve as either sharps or flats, depending upon the requirements of the music.

In order to clearly designate the cooperation between the sets of frequency determining segments and the keyboard, I have represented the first varying capacitor assembly as having the outermost path or ring of conductive segments 1*a* connected to plate 1*d* of the variable capacity element of playing key 1. The next concentric path of conductive segments is designated 13*a* and is connected through lead 13*b* with the variable capacity controlled by playing key 13. The next concentric path of conductive elements is indicated at 25*a* connected through lead 25*b* to the variable capacity controlled by playing key 25. The next inner concentric path or ring is designated at 37*a* having a lead 37*b* to the variable capacity controlled by the playing key 37. The innermost concentric path or ring is designated at 49*a* connected through lead 49*b* to the variable capacity controlled by playing key 49. The several concentric paths or rings of conductive segments are connected in the other sets of varying capacitor assemblies with the variable capacity controlled by other playing keys of the keyboard in a manner similar to the arrangement heretofore described. In order to indicate the manner of establishing the connection, I have designated the sets of conductive paths by subscript characters connected with the plates in the respective variable capacity elements controlled by the several playing keys, that is, plate 2*d* in the variable capacity element controlled by playing key 2 connects with the concentric path 2*a*. Similarly, plate 3*d* in the variable capacity element controlled by playing key 3 connects with the concentric path of conductive segments 3*a*. Corresponding connections are provided for the remaining playing keys of the keyboard. It will be seen that there is an independent path of conductive frequency determining elements for each of the forty nine playing keys, that is, in the capacitor assembly at the extreme left, there are five concentric paths of frequency determining elements and, in the remaining eleven varying capacitor assemblies, there are four concentric paths of frequency determining elements providing forty four complete frequency determining means in addition to the five frequency determining means in the first varying capacitor assembly.

The tones which are, therefore, obtained by depressing the keys, which I have designated 1 to 49 may be grouped in chromatic order as follows:

| | | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 1st octave | | $A_1$ | $A\#_1$ | $B_1$ | $C_1$ | $C\#_1$ | $D_1$ | $D\#_1$ | $E_1$ | $F_1$ | $F\#_1$ | $G_1$ | $G\#_1$ |
| | | 13 | 14 | 15 | 16 | 17 | 18 | 19 | 20 | 21 | 22 | 23 | 24 |
| 2nd octave | | $A_2$ | $A\#_2$ | $B_2$ | $C_2$ | $C\#_2$ | $D_2$ | $D\#_2$ | $E_2$ | $F_2$ | $F\#_2$ | $G_2$ | $G\#_2$ |
| | | 25 | 26 | 27 | 28 | 29 | 30 | 31 | 32 | 33 | 34 | 35 | 36 |
| 3rd octave | | $A_3$ | $A\#_3$ | $B_3$ | $C_3$ | $C\#_3$ | $D_3$ | $D\#_3$ | $E_3$ | $F_3$ | $F\#_3$ | $G_3$ | $G\#_3$ |
| | 37 | 38 | 39 | 40 | 41 | 42 | 43 | 44 | 45 | 46 | 47 | 48 | 49 |
| 4th octave | $A_4$ | $A\#_4$ | $B_4$ | $C_4$ | $C\#_4$ | $D_4$ | $D\#_4$ | $E_4$ | $F_4$ | $F\#_4$ | $G_4$ | $G\#_4$ | A |

By skillful operation of keys 1, 2, 3, etc., adjustment may be made of the sharpness of attack on each note played at the discretion of the player. When the tones commence suddenly, they impart a trumpet-like quality to the music. When the inception of each tone is more gradual, it tends to give a violin-like quality. By arranging the several keys so that the amplitude of the sound which is produced is proportional to the amount the key is depressed, the sharpness of the attack may be directly controlled. The input circuit to the varying capacitor assembly is designated at 51. The output circuit from the varying capacitor assembly is indicated at 52. In the radio frequency supply system of my invention, the apparatus is arranged as illustrated in Fig. 2 in which, reference character 53 designates a high frequency oscillator and a buffer amplifier for delivering high frequency current to the input terminals 51 of the varying capacitor assembly which includes the control keyboard. The output circuit 52 from the varying capacitor assembly is connected with the detector system 54 which, in turn, leads to the audio frequency amplifier 55, in the output circuit of which there is connected the sound producer 56.

The upper stator element 61 comprises quadrantal segments 61*a*, 61*b*, 61*c* and 61*d* connected through busses to switches 61*a*′, 61*b*′, 61*c*′ and 61*d*′ to the output circuit 52 of the varying capacitor assembly. The varying capacitor assembly in each of the twelve stages is identical except the gear structure for determining the rate of speed in which the rotor element is revolved and as heretofore pointed out the wave form of the frequency determining segments in each of the concentric rings on the several stator supports differs one from another. However the electrical phenomena involved in each of the varying capacitor assemblies is the same. Accordingly I have designated in Fig. 3 the twelve varying capacitor assemblies by the same symbol and for the purpose of explaining my invention, I will hereinafter designate the upper stator structure by reference character 61, the intermediate rotor by reference character 62 and the lower stator structure by reference character 63. The electrical phenomena which is involved will be clear from consideration of Fig. 3 wherein reference character 64 designates an electron tube oscillator connected with oscillating circuit 65 for the production of sustained high frequency oscillations which are delivered through output circuit 66 to the buffer stage of amplification including electron tube 67. The output circuit of the buffer amplifier stage 67 is designated at 68 and is shown connected to lead 69 with each of the rotor elements 62 of all of the varying capacitor assemblies and with a selected ring or path of conductive segments on the lower stator plate 63 through the interposition of a capacity keying member arranged in circuit as illustrated in Fig. 1. In order to avoid confusion in the diagram of Fig. 3 I have eliminated the varying capacity playing keys illustrated in Fig. 1, but it will be understood that by actuation of a selected playing key the high frequency energy is caused to pass from a selected set of energy is caused to pass from a selected set of conductive segments on stator unit 63 to selected selectors on stator unit 61 by the alternate exposure and shielding action effected by rotation of the rotor plates 62. The output from the varying capacitor assemblies extends through conductor 69 from the rotor plates 62 and the upper segments of the capacity area 61 to the input circuit of the detector system 54, whereby the detector circuit is modulated for controlling the operation of the associated amplifier system 55 which connects to the sound producer 56.

The modulation of the radio frequency energy generated by oscillator 64 and amplified through buffer amplifier 67 is effected at a rate dependent upon the movement of the shaped segmental areas in the concentric paths carried by the lower stator element 63 for the selective production of a desired tone in the electrical sound producer. The varying capacitor assemblies produce a varying reactance which changes periodically with time. This varying reactance is employed to modulate the radio frequency current which when impressed upon the detector 54 produces an audible note in the sound producer 56 whose pitch and wave-form, hence timbre, may be made to depend exclusively on the speed of rotation and the geometric shape of the disc. Modulation may be accomplished by amplitude modulation, frequency modulation or by a combination of amplitude and frequency modulation. In the amplitude modulation method, the radio frequency energy which is generated is coupled through the varying reactance produced by the varying capacitor assembly to the detector in the manner heretofore described. In frequency modulation systems the varying reactance of the varying capacitor assembly is connected as a tuning capacity of the oscillatory system for directly modulating the frequency of the high frequency generator which is amplified and impressed upon the detector, effecting the reproduction of sound. In the combined amplitude and frequency modulation system the varying reactances of the varying capacitor assembly is employed for controlling regeneration in the self-oscillating system of the oscillator for effecting both frequency and amplitude modulation. This method will produce the greatest modulating effect but is the most difficult to calculate. If only amplitude modulation is employed, an untuned detector circuit may be used. Otherwise a tuned detector circuit should be employed. The modulation system illustrated in Fig. 3 has many advantages for the obtaining of accurate control of the produced sound. However there are instances in which it is undesirable to employ the oscillator illustrated in Fig. 1. I may therefore utilize the direct current system which will be understood from Figs. 4, 5 and 6.

In the direct current system, schematically illustrated in Fig. 5, the direct current source 70 is connected to the input circuit 51 of the varying capacitor assembly. The output circuit 52 of the varying capacitor assembly connects directly to the audio frequency amplifier 55 which connects to the sound producer 56. In this arrangement the impulses supplied to the grid circuit of the amplifier 55 are directly varied according to an audio frequency rate under control of the varying capacitor assembly. This greatly simplifies the keyboard for, as illustrated in Fig. 4, it is no longer necessary to utilize the variable capacity type of keyboard illustrated in Fig. 1. In lieu thereof, direct contact keys are provided as represented at 1*c*, 2*c*, 3*c*, 4*c*, 5*c*, 6*c*, 7*c*, 8*c*, 9*c*, 10*c*, 11*c*, 12*c*, 13*c*, 14*c*, 15*c*, 16*c*, 17*c*, 18*c*, 19*c*, 20*c*, . . . 49*c*. The input terminals to the varying capacitor assembly are designated as before at 51 and the output terminals have been designated at 52. As shown in Fig. 6 the source of potential 70 is applied across the rotor element 62 and the selected path of conductive segments on the lower stator element 63. The output circuit from the varying capacitor assembly extends from the rotor elements 62 to one side of the input circuit of amplier 55. The segmental areas of the upper stator element 61 connect to the other side of the input to the amplifier circuit 55, the output of which connects to sound producer 56. The same provision is made in the circuit arrangement of Fig. 4 for the selection of the sectors 61a, 61b, 61c and 61d of the upper stator element 61 as that described in connection with Fig. 1, that is switching elements 61a', 61b', 61c' and 61d' are provided for interconnecting the upper stator element to the output circuit 52 of the varying capacitor assembly.

The structure of the varying capacitor assembly, and theory of operation thereof, will be more fully understood by reference to Figs. 7–16. Fig. 7 is a theoretical diagram showing the manner of impressing a potential across selected segments of the stator 63 and the rotor 62 and the selected transfer of energy modulated according to the rate of rotation of rotor 62 across terminals connected with the upper stator plate 61 and rotor 62. The potential impressed across the system is designated E. The modulated potential has been designated $e$. The capacities across the plates have been designated $C_1$ and $C_2$. In Fig. 8 I have shown the manner in which the rotor 62 determines the capacity exposure of one of the elements 63a on stator 63 with respect to the sectors on stator 61. Intermediate the apertures in the rotor there are solid areas which serve to electrostatically shield the conductive segments on stator 63 from the conductive sectors on stator 61.

The relationship of the potentials and the effective capacities for producing necessary modulation in the direct current case may be determined as follows:

$$e=E\frac{\frac{1}{C_2}}{\frac{1}{C_1}+\frac{1}{C_2}}=E\frac{\frac{1}{C_2}}{\frac{1}{C_1}}=E\frac{C_1}{C_2}$$

If $$C_1 \ll C_2$$

Now if $$C_1=C_m \sin 2\pi ft$$

$$C_2 \gg C_m$$

$f$=an audio frequency.

$$e_m=E\frac{C_m}{C_2}\times \sin 2\pi ft$$

an audio frequency wave which requires only amplifying for operation of the sound producer.

For the radio frequency case the relationship of the parts for obtaining the required modulation and sound production, is as follows: Let $E=E_m \sin 2\pi Ft$ where $F$=radio frequency.

Then $$e=E_m \sin 2\pi Ft\frac{\frac{1}{2\pi FC_2}}{\frac{1}{2\pi FC_1}+\frac{1}{2\pi FC_2}}=$$

$$\frac{\frac{1}{2\pi FC_2}}{\frac{1}{2\pi FC_1}}E_m \sin 2\pi Ft=\frac{C_1}{C_2}E_m \sin 2\pi Ft$$

Now if $$C_1=C_m \sin 2\pi ft$$

as before, then $$e=\frac{E_mC_m}{C_2}\sin 2\pi Ft \sin 2\pi ft$$

This is a modulated radio frequency from which an audio note of frequency $f$ can be obtained by detection. It is noteworthy that $C_2$ may be replaced by any impedance Z without bad results, if only $$Z \ll \frac{1}{C_1}$$

Furthermore, the variation law of $C_1$ need not be a sine function, it can be any function and the audio note will have the corresponding waveform.

Figure 9:
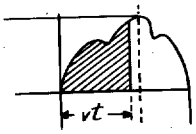
Figure 10:
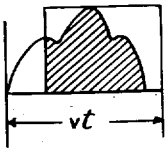

Figs. 9 and 10 show the theoretical condition which prevails as the rotor sweeps progressively across the stator segments at a velocity V in a time interval $t$.

The proper shape of the segments of stator 63 may be calculated from a harmonic analysis of the desired tone quality. The results of this harmonic analysis will be expressed as follows:

$$E=E_o[a_1 \sin wt+a_2 \sin 2wt+a_3 \sin 3wt+ \ldots +a_n \sin nwt]$$

If this represents the desired tone, the equation of the upper bounding curve of the corresponding segment is, in polar coordinates, $$R=R'+R_0[a_1 \sin wx+2a_2 \sin wx+ \ldots +na_n \sin nwx]$$

where R'=radius of rotor plate to inside of the corresponding rotor aperture; $R_o$=radial thickness of rotor aperture; X=angular displacement from some fixed line divided by twice the number of segments in the ring.

Figure 11:
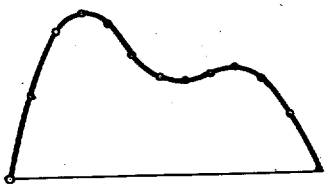
Figure 12:
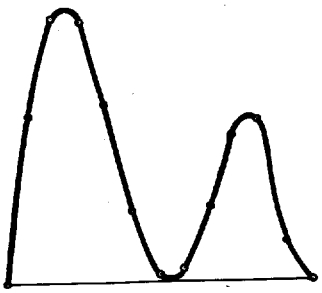
Figure 13:
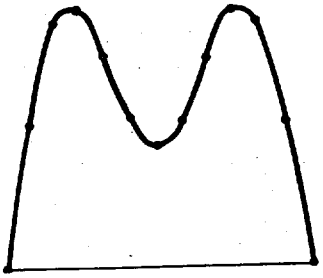

Fig. 11 shows the wave form for the segment to produce the tone equivalent to a violin E string. The shape of the curve for producing the tone equivalent to a violin E string may also be a wave form as illustrated in Fig. 12. By adjusting the phase of the several components, the segment may be given the shape indicated in Fig. 13 for producing a tone equivalent to a violin E string.

Figure 14:
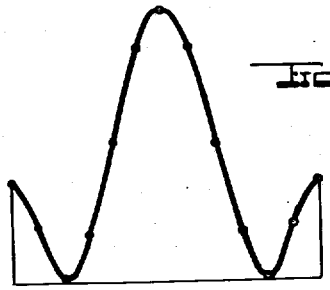
Figure 15:
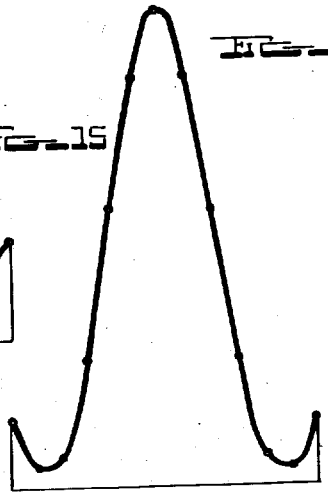
Figure 16:
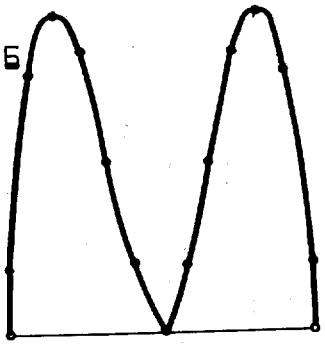

I have found that similar tones may be obtained by shaping the segment as illustrated in Figs. 15, 14 or 16. The selection of the proper segment, therefore, becomes a mechanical choice as to which segment can be most easily constructed. The segments may be stamped or pressed from sheet metal or may be electrolytically deposited on a suitable base.

The varying capacitor assembly is divided into groups the number of which is equal to the number of tone qualities or stops desired in the instrument.

The rotor plate 62 is shown more clearly in Figs. 17 and 18 from which it will be seen that the rotor is driven from a central shaft 71 and is provided with a concentric circular aperture heretofore described. I have designated the apertures in concentric paths or circles at 62a, 62b, 62c and 62d. These apertures are given such areas as will permit the conductive segments 63a, 63b, 63c and 63d, carried by stator 63, to be exposed capacitatively with respect to sectors 61a, 61b, 61c and 61d of stator 61. The apertures in rotor 62 as illustrated in Figs. 17 and 18 in the nature of a section of an annulus.

The variable capacitor assemblies have their rotor plates 62 capacitatively related to the associated stator plates 61 and 63 in circuit with the input of amplifier 55 at all times, which imposes a large capacity across the input of amplifier 55, thereby inherently rendering the amplifier quasi-linear in operation. If any additional capacity is required to render the amplifier 55 quasi-linear ,such capacity is supplied by condenser 55a in shunt to resistor 55b in the input circuit of amplifier 55. The amplifier 55 thus operates as a quasi-linear amplifier and reproduces all frequencies within the band of frequencies covered by the several variable capacitor assemblies with substantial uniformity.

I have shown the apertures in the rotor 62 divided into groups similar to the grouping of the segments on the stator of Fig. 19 and similar to the grouping of the sectors on the stator 61. The apertures in the rotor 62 shown in Figs. 17 and 18 and the segments on the stator 63 shown in Figs. 19 and 20 are disposed in quadrantal groups I, II, III and IV. The sectors on the upper stator plate 61, as shown in Figs. 21 and 22, are secured in position by means of rivet members or other suitable means represented generally at 72. The shapes illustrated in Fig. 19 are not to be considered in the limiting sense but are suggestive of a variety of shapes which may be employed. The important principle established by the structure shown in Fig. 19 is the division of the segments into quadrants, that is, the segments 63*d* in quadrant I are shaped to produce a tone similar to the E string of a violin. In quadrant I, the segments 63*c* are shaped to produce a tone equivalent to the A string of a violin. In quadrant I, segments 63*b* are shaped to produce a tone similar to the G string of a violin. The segment 63*a* in quadrant I is shaped to produce a tone equivalent to the G string of a violin in the next lower octave. The several segments described in quadrant I are aligned with sector 61*a* of the upper stator 61.

In quadrant II, the segments have substantially a sine wave shape. The segments in quadrant II produce pure tones similar to a tuning fork, the frequency progressing from the highest frequency in path 63*d* to a lower frequency in path 63*c*, then a succeeding lower frequency in path 63*b* and to the lowest frequency in path 63*a*. It will be understood that there are twelve units of the character shown in Fig. 19 so that all of the twelve semi-tones in an octave may be produced. All of the segments in quadrant II are of the same note, the pitch or frequency differing by an octave between successive rings.

In quadrant III, the segments have a shape imparted thereto including a number of harmonics of which the fourth is probably the strongest. That is, the segments have a serpentine edge portion as illustrated in quadrant III. As explained in connection with quadrant II, the outer ring of segments 63*d* produces the highest frequency, the next inner ring a lower frequency, and the next inner ring a still lower frequency and the final inner ring the lowest frequency in the same note, as described in connection with quadrants I and II.

In quadrant IV, the segments are polygonal in shape or rhomboidal for producing a complex tone in the same note as the segments in the other three quadrants. The same order of progressive frequency is obtained, that is, the outer ring 63*d* in quadrant IV produces the highest frequency, the next inner ring 63*c* produces the lower frequency, the ring 63*b* produces the next succeeding lower frequency and the ring 63*a* produces the lowest frequency, all of which are separated by octaves.

The tone quality produced by the apparatus of my invention may be adjusted by shaping of the segments as described, or by electrically tuning the amplifier circuits with which the apparatus is associated. The sectors 61*a*, 61*b*, 61*c* and 61*d*, as heretofore explained, are directly aligned with the quadrants I, II, III and IV, with the apertures in plate 62 passing therebetween to alternately expose the sectors to the segments in capacitative relation. As heretofore explained in connection with Figs. 1 and 4, switches 61*a*′, 61*b*′, 61*c*′ and 61*d*′ serve as stops for the electric organ of my invention and selectively connect corresponding sectors 61*a*, 61*b*, 61*c* and 61*d* of the stator 61 to the output circuit. This enables the tone frequency from one or more of the quadrants I, II, III and IV to be selected for controlling the sound producing circuit. That is to say the sectors 61*a*, 61*b*, 61*c* and 61*d* serve as pickups for the capacitative transfer of energy from aligned segments in the associated quadrants and by moving the stops in various combinations the produced tone quality may be controlled.

As represented in Fig. 23, the segments in the several circular paths are electrically connected by means of concentric busses 73, 74, 75 and 76. Connections are taken from each of these busses to selected keying circuits. In the circuit arrangement of Fig. 1 these connections lead to capacity areas 1*d*, 2*d*, 3*d*, 4*d*, etc. from the different varying capacitor assemblies in the form of the invention illustrated in Fig. 1. In the form of the invention illustrated in Fig. 4 the busses 73, 74, 75 and 76 connect to the keys 1*c*, 2*c*, 3*c*, 4*c*, etc. I have illustrated schematically the circuit which extends from the busses 73, 74, 75, 76 in Fig. 3 as the circuits passing through the keys 1, 2, 3, 4, etc. In the form of the invention illustrated in Fig. 3, the keys 1, 2, 3, 4, etc., are variable capacity devices, as illustrated more clearly in Fig. 1. However in the form of the invention illustrated in Figs. 4 and 5, the keys 1*c*, 2*c*, 3*c*, 4*c*, etc. may be direct circuit closing devices.

The varying capacitor assembly is mounted in a cabinet structure illustrated more clearly in Figs. 24–28. The upper stator 61 is suspended from the upper portion 77 of the cabinet by means of spacing member 78 and supporting member 79 in such manner that the sectors 61*a*, 61*b*, 61*c* and 61*d* are supported in alignment over the apertures in rotor 62 as heretofore explained. The lower stator 63 carrying segments 63*a*, 63*b*, 63*c*, 63*d* is supported in fixed relation to the cabinet structure beneath the plane of the rotor 62. The rotor 62 is driven by shaft 71 which is mounted in a ball bearing journal represented generally at 80 carried by the cabinet structure. Shaft 71 has a gear 81 secured thereto extending in a horizontal plane and adapted to mesh with corresponding gears on each of the variable capacitor assemblies, as shown in plan view in Fig. 27. The structure illustrated is merely explanatory of one form of my invention and it will be understood that various forms of drives may be used. The varying capacitor assemblies operate at different speeds for producing different frequencies and for this reason a progressive ratio is selected. For the usual even tempered musical scale the speed ratio of adjacent shafts is 1 as to the 12th root of 2. The motor 82 drives all of the gears 81 through pinion 83 in any suitable arrangement. The variable capacity elements which control the attack are arranged immediately behind the keys 1–49. Figs. 24, 25 and 26 are illustrative of the structure of all of these capacity type keys. The key 1 is pivoted at 84 and is subjected to spring tension by coil spring 85 which normally elevates the key and maintains the shield plate 86 in the full line position shown in Fig. 24 with the edge of the shield plate abutting against stop 87. In this position shield plate 86 prevents the transfer of energy between capacity area 1*d* and capacity area 1*e*. The capacity areas 1*d* and 1*e* are representative of the group of capacity areas employed for all of the keys 1–49 illustrated in Fig. 1, which shows the capacity areas at 1*d*—1*e*, 2*d*—2*e*, 3*d*—3*e*, 4*d*—4*e*, etc. The capacity areas 1*d* and 1*e* are insulatingly supported from insulators 88 and 89 mounted on partition plates 90 and 91, respectively. An intermediate partition plate 92 has an aperture 93 therein through which plates 1*d* and 1*e* may be directly exposed when shield 86 is moved out of position by depressing key 1. By changing the capacity according to the keying in this manner the attack is controlled. As heretofore explained the electromagnetic elements 94 mounted beneath each of the playing keys do not function to attract the playing keys but are utilized as means for holding the playing keys in depressed position for maintaining the shield 86 out of alignment with capacity areas 1*e* and 1*d*, thereby prolonging the note which is produced by the electrical producer. As heretofore explained the magnets 94 are electrically connected in series with source 95 through master key 50. The electromagnetic system for controlling the position of the playing keys may be applied to circuit closing keys of the kind illustrated in Fig. 4 in lieu of the capacity key shown in Fig. 1.

I have described my invention in certain of its preferred embodiments but I desire that it be understood that modifications may be made and that no limitations upon my invention are intended other than are imposed by the scope of the appended claims.

What I claim as new and desire to secure by Letters Patent of the United States is as follows:

1. In a system for the production of sound, an electron tube system having input and output circuits, an electrical sound producer connected with said output circuit, a multiplicity of continuously varying capacity elements productive of frequencies corresponding to the frequencies of a musical scale, a keyboard for selectively establishing a circuit connection with one or more of said continuously varying capacities and the input of said electron tube system, and means individual to each of said circuit connections for making the amplitude of the resultant tone increase with increasing displacement of the key.

2. In a musical instrument, a capacitor assembly comprising an upper stator element, a lower stator element, quadrantal sectors carried by said upper stator element, conductive segments of preformed shapes disposed on said lower stator element, and a rotor element in groups homologous to said quadrantal sectors of said upper stator element, all segments in one of said sectors being similar to each other but different from the segments in other of said sectors operative between said stator elements, said rotor element having preformed perforations therein and operating to successively expose and shield said sectors with respect to said segments.

3. In an electrical musical instrument comprising an electron tube system, a sound producing apparatus, a multiplicity of rotatably driven continuously varying capacitive reactances each constituting a musical frequency determining means and including a plurality of capacity elements for each note, said plurality of capacity elements productive of different timbres or tone equalities, a circuit connected with each of said capacity elements, controlling switches individual to each of said circuits for selectively connecting one or more of said circuits to said electron tube system, variable keying switches individual to each of said varying reactances for selectively connecting one or more of the said musical frequency determining means to the sound producing apparatus, the combination of said switching means selectively controlling the timbre as well as the pitch of the tones emitted by the instrument.

4. In a system for electrical production of music, a source of potential, means for modulating said source of potential comprising a plurality of rotatably varying capacitor assemblies, each of said varying capacitor assemblies productive of a series of notes of the even-tempered musical scale, the notes of an individual assembly being harmonics of a fundamental note thereof, each of said varying capacitor essemblies being divided into a multiplicity of sections, each of said sections productive of an individual timbre for said notes of said assembly, means for relatively driving each of said rotatably varying capacitor assemblies in the ratio of one as to the twelfth root of two for adjacent units, said driving ratio producing on adjacent units notes of frequencies in the ratio of one as to the twelfth root of two, notes in said ratio being successive in the even-tempered musical scale, an electron tube circuit having input and output circuits, an electrical sound producer connected to said output circuit, switching means for connecting one or all of said sections of said varying capacitor assembly to said input circuit, and variable coupling means individual to each harmonic of each note produced in said varying capacitor assemblies for selectively connecting any harmonic of any note singly or in combination through said sections to said input circuit.

5. In an electrical musical instrument, a continuously varying condenser, input and output terminals for said condenser, said condenser comprising three parallel plates, the central one of said plates being movable and connected to one of said input terminals and one of said output terminals, one of the stator plates of said condenser being connected to the other of said output terminals, the other stator plate of said condenser being connected to the other of said input terminals, a source of potential connected to said input terminals, the shape of said plates and the said motion thereof acting to produce a modulation of said source of potential in accordance with a predetermined wave form, an electron tube system connected to said output terminals and an electrical sound producer connected with said electron tube system.

6. In an electrical musical instrument, generators of electric potentials having frequencies corresponding to the frequencies of a musical scale, an electron tube amplifier and an electric sound producer; a multiplicity of keys for selectively connecting said generators to the input of said electron tube amplifier, the keys being so constructed that the amplitude of the electric potential effective in the input circuit of the electron tube amplifier increases as the force applied to the key by the operator is increased, and electromagnetic means individual to each of said keys for maintaining a selected tone after the key is manually released.

7. In an electrical musical instrument comprising a multiplicity of generators of electrical potentials having frequencies corresponding to frequencies of a musical scale, a multiplicity of keys, amplification and sound reproducing means controlled thereby, a multiplicity of adjustable condensers, the capacity of each of said adjustable condensers being controlled by one of said keys, and each of said adjustable condensers being included in an electrical circuit which also includes one of said generators.

8. In an electrical musical instrument, comprising a multiplicity of generators of electrical potentials having frequencies corresponding to frequencies of a musical scale, a multiplicity of keys, amplification and sound reproducing means controlled thereby, a multiplicity of adjustable impedance elements, the electrical impedance of each of said adjustable impedance elements being controlled by one of said keys, and each of said adjustable impedances being included in an electrical circuit which also includes one of said generators.

9. In an electrical musical instrument, comprising a multiplicity of generators of electrical potentials having frequencies corresponding to frequencies of a musical scale, a multiplicity of keys, amplification and sound reproducing means controlled thereby, a multiplicity of adjustable resistors, the resistance of each of said adjustable resistors being controlled by each of said keys, and each of said adjustable resistors being included in an electrical circuit which also includes one of said generators.

10. In an electrical musical instrument comprising a multiplicity of generators of electrical potentials having frequencies corresponding to frequencies of a musical scale, a multiplicity of keys, amplification and sound reproducing means controlled thereby, a multiplicity of variable impedance elements, the magnitude of the electrical impedance of each of said variable impedance elements being controlled by one of said keys, and each of said variable impedance elements being included in an electrical circuit which forms a part of the electrical network through which electrical impulses from one of said generators are transmitted to said electrical sound reproducing means.

11. In an electrical musical instrument, an electric sound producer, a multiplicity of keys, a multiplicity of generators of electric potentials of frequencies corresponding to the frequencies of a musical scale and a source of electrical potential, a multiplicity of variable impedance elements, the magnitude of the electrical impedance of each of said variable impedance elements being controlled by one of said keys, and each of said variable impedance elements being connected in an electrical circuit which includes said source of potential and one of said generators.

12. A device for originating waveforms translatable into sound, comprising a plurality of condensers each having two terminals, actuating means for continuously varying the capacitances of said condensers in accordance with said waveforms, a source of polarizing electro-motive force for said condensers, a coupling element having a plurality of terminals, and means for selecting said condensers and for completing circuit branches between a terminal of said element and a terminal of one of said condensers, the terminals connected to said branches being other than those connected to said source.

13. An electrical musical instrument comprising a condenser and actuating means for varying the capacitance and the effective area of said condenser in accordance with a substantially sinusoidal function of time; said condenser having an electrode of wavy contour; said condenser having also a plurality of scanning instrumentalities adapted to move at a uniform speed relative to said electrode, spaced at a distance apart equal to an integral multiple of the wavelength of said wavy contour, and adapted to sequentially scan said electrode.

14. An electrical musical instrument comprising a condenser and actuating means for varying the capacitance of said condenser in accordance with a predetermined waveform; said condenser having an electrode of wavy contour and a straight-sided scanning instrumentality adapted to be moved relative to said electrode by said actuating means and to recurrently scan said electrode.

15. A device for originating a waveform translatable into sound, comprising a condenser, actuating means for continuously varying the capacitance of said condenser in accordance with said waveform, a sound translating circuit adapted to be energized from said condenser and to translate said waveform into sound, and means for sustaining said sound.

16. A device for originating a waveform, comprising a vacuum tube system, an input circuit adapted to be connected to the input terminals of said system, means for producing in said circuit variable electromotive force translatable into sound, and a variable capacitance in said circuit for selecting said means and for gradually varying its effect upon said circuit and said system.

17. In a musical instrument, an electrical sound producer; an electrical circuit for controlling the operation of said sound producer; a multiplicity of tone originating assemblies for originating alternating voltages of different wave forms and frequencies, each assembly including means comprising sets of opposed current conducting areas spaced apart from each other to provide an air gap therebetween; a metallic element mounted for rotational motion in said air gap between said sets of areas; a polarizing source for said conducting areas, said metallic element being formed with openings related to each other to alternately expose said areas of said sets to each other for the production of voltage pulsations of a frequency adapted to be predetermined by the rotational speed of the metallic element, the openings and said areas being of predetermined sizes and shapes and mutually coacting to produce voltage pulsations prescribed by the shapes of the exposed areas, and means enabling produced voltage pulsations of any desired frequency and waveform to be selectively impressed upon said electrical circuit for controlling said sound producer for the production of audible sound of desired frequency and waveform.

18. In an electrical musical instrument employing playing keys, an electrical sound producer and an electron tube responsive to exciting current for actuating said sound producer; an electrostatic inductor alternator and a polarizing potential therefor, said alternator embodying waveform pattern areas and a scanning element cooperable therewith to produce capacitance changes in the alternator of the frequencies and waveforms of different musical tones, and an electrical circuit including said playing keys for selectively impressing alternating voltages produced by said alternator upon the control electrode of said tube with resulting actuation of the sound producer for the production of audible sound of predetermined frequency and waveform.

19. In an electrical musical instrument, the combination with an electron tube and a sound producer, the latter responsive to excitation of said tube for the production of audible sound; of an alternating current generator comprising preformed conductive areas and an interposed rotatable shield, the latter having preformed perforations at predetermined intervals adapted to expose said areas to each other at a rate to control excitation of said tube for actuation of said sound producer and resulting production of audible sound of predetermined waveform and frequency.

20. In an electrical musical instrument, the combination with an electron tube, a sound producer responsive to excitation of said tube for the production of audible sound, and a manual employing playing keys, of an alternating current generator assembly having conductive areas and an interposed rotatable shield formed to cause exposure of said areas for excitation of said tube and actuation of said sound producer for the production of audible tones of different frequencies and waveforms; and means controlled through said playing keys for selective excitation of said tube accordingly as a particular musical tone is desired to be sounded.

21. In an electrical musical instrument having an amplifier and electroacoustic translating means, the combination of a plurality of capacitances continuously varying at musical frequencies, a plurality of keys, a source of super-audible frequency, and a plurality of variable condensers operated respectively by said keys to couple said source to said capacitances.

22. In an electrical musical instrument having an amplifier and electroacoustic translating means, the combination of a plurality of rotary condensers, continuously varying at musical frequencies, a plurality of keys, a source of super-audible frequency, and a plurality of variable condensers operated respectively by said keys to couple said source to said capacitances.

23. In an electrical musical instrument having a plurality of keys, a generator of super-audible frequency, an electron discharge device having an output circuit and an input circuit with two input terminals, an inductance and a capacity in shunt effectively connected across said input terminals, and a circuit for coupling said generator to said device, said circuit including the following elements effectively in series: said generator, a condenser of variable capacity actuated by one of said keys, a second condenser the capacity of which is continuously varied at a musical rate, and the input circuit of said electron discharge device.

24. In an electrical musical instrument having means for translating electrical energy into sound energy; sources respectively producing alternating potentials at different tone frequencies, an electrical network for the transmission of alternating potentials to said translating means, playing keys, and capacitative means for and controlled by each playing key for coupling an individual alternating potential source with said translating means and for rendering said network capacitative at a variable rate determined by the extent of motion of said key to and from a playing position and thereby govern the rate of growth and decay of the tone being sounded.

WESTLEY F. CURTIS.